Figures 1, 2:
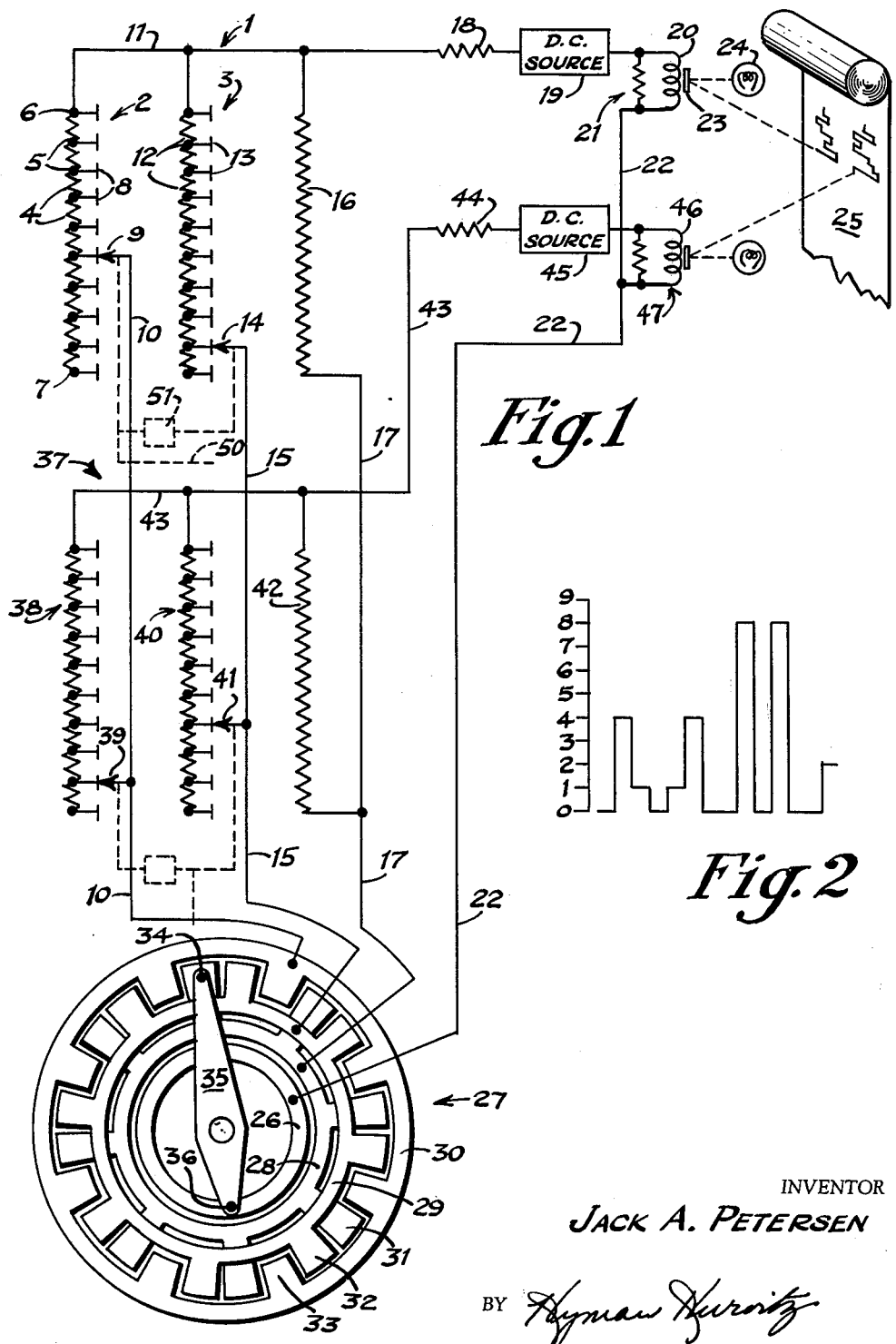

March 21, 1961 — J. A. PETERSEN — 2,976,104
DIGITAL RECORDING
Filed Oct. 6, 1955

INVENTOR
JACK A. PETERSEN
BY Hyman Hurvitz
ATTORNEY

United States Patent Office 2,976,104
Patented Mar. 21, 1961

2,976,104

DIGITAL RECORDING

Jack Allen Petersen, Eau Gallie, Fla., assignor to Radiation, Inc., Melbourne, Fla., a corporation of Florida Filed Oct. 6, 1955, Ser. No. 538,920

5 Claims. (Cl. 346—33)

The present invention relates generally to data recording instruments, and more particularly to recording instruments for producing digitized records of multiple digit numbers.

The accuracy obtainable in analog recording techniques is contingent on the care employed and the precision maintained during recording, during processing of the record produced by the recorder, and during reduction of the data recorded. Extremely linear amplifier circuits must be employed. The recording instrument must have a linear characteristic throughout its entire operating range and it is imperative that the record be not physically deformed during processing thereof. This is particularly difficult in the case of photographic recording. Data reduction of the processed record is extremely tedious, since it is necessary that each analog quantity be accurately measured to determine the value it represents.

It is an object of the present invention to record data in digital form, to reduce the accuracy required of the recording instrument, the care that must be exercised during processing of the record, and the accuracy required of the individual performing data reduction.

It is another object of the present invention to provide a digital recording system which requires distinction between distinct quantized levels on a record, during data reduction.

Another object of the present invention is to provide a digital recording system for recording multiple digit numbers wherein each digit of the number is recorded at a different quantized level on the record.

It is another object of the present invention to record data representing multiple digit numbers in terms of separate indications for the separate digits of each multiple digit number.

Still another object of the present invention is to provide a digital recording system for recording multiple digit numbers wherein each digit of each number is represented on the record by a distinct quantized indication, the amplitude of each indication being a function of the digit it represents.

Yet another object of the present invention is to provide a digital recording system for simultaneously recording a plurality of multiple-digit numbers in distinct parallel channels on a recording medium, wherein each digit of each multiple digit number is represented by a separate indication on the record medium.

Still another object of the present invention is to provide a digital recording system for recording a multiple digit number, wherein a variable resistor is provided for each positional value of the multiple digit number and means are provided for setting the value of each resistor as a function of the number to be represented thereby, and wherein the resistors are sequentially and successively connected in series with a recording instrument, each variable resistor providing a weighted current flow through the recording instrument, indicative of the number represented by the variable resistor.

Another object of the present invention is to provide a digital recording system for concurrently recording a plurality of indications, in which each indication is indicative of a different multiple digit number, and wherein the recording apparatus includes a plurality of variable resistors equal in number to all of the digits of the multiple digit number, each variable resistor establishing a resistance representative of one of the digits.

Briefly describing the invention, separate indicating means is provided for each multiple digit number which is to be recorded. A series circuit, made up of equal resistances, is provided for each digit of each multiple digit number which is to be recorded. Considering a single multiple digit number, in the decimal system of numeration, nine resistances per digit are required in each series circuit. Resistances are selected in each series circuit, in accordance with the numeral to be represented, and the separate series circuits commutated in sequence to the recorder. As the recording medium moves, successive numerals are recorded in longitudinal sequence, in terms of transverse indications. Longitudinal position along the recording medium, then, represents the decimal value of each recorded digit, and transverse extensions of the indications represent the values of the separate digits. The commutator employed for sequentially and successively coupling the variable resistors representing the digits of a multiple digit number to one of the indicating instruments may be employed for simultaneously coupling other variable resistors, representing digits having positional values in other multiple digit numbers, to a different one of the indicator instruments. There may be further provided a fixed resistor representative of the number zero, which is coupled to the indicating instrument by the commutator, when the latter has completed each multiple digit number, to provide a zero or base line indication between successive multiple digit numbers. Since each multiple digit number is recorded by a separate recording instrument, a single commutator may be employed for all of the recording channels.

The above and still further features, objects, and advantages of the invention will become apparent upon consideration of the following detailed description of a specific embodiment of the invention, especially when taken in conjunction with the accompanying drawings, wherein:

Figure 1 is a schematic wiring diagram of a digital recorder in accordance with the present invention; and Figure 2 is a recorded indication, provided by the recording system of the present invention.

Referring now more particularly to Figure 1 of the accompanying drawings, there is provided a convertor, generally designated by reference numeral 1, for converting a mechanical representation of a multiple decimal digit number into a plurality of quantized electrical quantities, each electrical quantity being representative of one digit of the multiple digit number. Assuming a two digit number, for the sake of simplicity of exposition, the convertor 1 includes a digitizer 2 for producing an electrical quantity representative of the tens digit of the number, and a digitizer 3 for producing an electrical quantity representative of the units digit of the number. The digitizer 2 includes nine equal value resistors 4 connected as a resistive series, the junctions 5 of each pair of resistors 4, as well as end terminals 6 and 7 of the resistive series, being connected each to a different stationary switch contact 8. A movable switch contact 9, connected to a lead 10, is adapted to be selectively engaged with any one of the contacts 8. The terminal 6 of the resistive series is connected to a lead 11.

By appropriately positioning the contact 9 any number of resistors 4 may be included between the leads 10 and 11. The contact 9 may be positioned by hand, or by a condition responsive motor, or alternatively the contacts 8 and 9 may be eliminated and electronic switching substituted. In the latter case, the multiple digit number may be set up in ring counter circuits, the output of the ring counter circuits being employed to gate electronic switches to apply a fixed potential across a predetermined number of resistors 4 representative of the number to be recorded.

The digitizer 3 may be identical to the digitizer 2, and may include nine equal value resistors 12 connected in a resistive series, the resistors 12 being equal in value to the resistors 4. An end terminal of the resistor series is connected to lead 11, and the end terminals of the resistive series 3 as well as the junctions of the pairs of resistors 12 are each connected to a separate stationary switch contact 13. A movable switch contact 14, connected to a lead 15, is adapted to be selectively engaged with any one of the contacts 13. By appropriately positioning the contact 14 any desired number of resistors 12 may be connected in series between the leads 11 and 15.

The contact 14 may be positioned by hand or by a condition responsive motor. Since the contact 14 is associated with the units digitizer 3, it must be varied through all of its ten switch positions while the contact 9 of the tens digitizer is varied through a single switch position. To accomplish this result the contact 9 is directly mechanically coupled to a shaft 50 and the contact 14 is mechanically coupled to the shaft 50 through gearing 51 which has a ten-to-one gear increase ratio. The shaft 50 is rotated to have an angle of rotation in accordance with a quantity to be displayed.

The converter 1 further includes a resistor 16 having a resistance equal to the total resistance of the series connected resistors 4, or the series connected resistors 12. One end terminal of resistor 16 is connected to lead 11, and the other end terminal is connected to a lead 17.

The lead 11 is connected through a limiting resistor 18 to one terminal of a source of D.C. potential 19. The other terminal of the source 19 is connected to one terminal of a current responsive movable element 20 of a galvanometer 21. The other terminal of element 20 is connected to a lead 22. The element 20 may be provided with a mirror 23 for reflecting light from a light source 24 to a photographic recording medium 25, assumed to be moving into the plane of the drawing. In response to variation in current flow through the element 20, the angle of incidence between the mirror 23 and the light from the source 24 is varied, varying the transverse position of recording medium 25 for which light reflected from the mirror 23 impinges on the recording medium 25. There is accordingly generated a variable amplitude recording, representative of the current flowing through the coil 20. The galvanometer 21, although particularly applicable to utilization with the present invention may be replaced by some alternative device for generating a movable light beam, such as a cathode-ray oscilloscope, or non-photographic recording techniques may be employed.

The lead 22 is connected to a conductive ring 26 of a commutator 27. The commutator 27 further comprises conductive rings 28, 29 and 30, concentric with ring 26. The rings 28 and 29 are provided with a plurality of circumferentially-spaced, outwardly-protruding, radial extensions 31 and 32, respectively, and the ring 30 is provided with a plurality of circumferentially-spaced, inwardly-protruding radial extensions 33. The conductive extensions 31, 32 and 33 lie on a common radius and are adapted to be selectively engaged by a contact 34 carried on one end of a rotatable conductive arm 35. The rotatable arm 35 is rotatable about the axis of the conductive rings 26, 29, and 30, and is provided with a second contact 36 permanently engaged with the conductive ring 26.

Upon rotation of the arm 35 in a counterclockwise sense the contact 34 sequentially and successively engages the conductive segments 33, 32 and 31, in that order, thereby selectively connecting these segments through the arm 35 to the concentric ring 26. Each of the concentric rings 28, 29, and 30 is connected to a different one of the leads 10, 15, and 17 of the converter 1, the ring 28 being connected to the lead 17, the ring 29 being connected to the lead 15, and the ring 30 being connected to the lead 10.

When contact 34 of the arm 35 is positioned on a segment 33 of the conductive ring 30 a series circuit is completed from the conductive ring 30 over lead 10, through a predetermined number of resistors 4, as determined by the positioning of a contact 9, and thence over the lead 11, through limiting resistor 18, D.C. source 19, and through element 20 of galvanometer 21, over lead 22 to conductive ring 26, and from conductive ring 26 through contact 36 and commutator arm 35 back to segment 33 of conductive ring 30. The number of resistors 4 connected in this series circuit determines the amplitude of the current in the circuit, and therefore determines the deflection of the element 20 of galvanometer 21, and hence the transverse location of a record on record receiver 25. With all the resistors 4 connected between lead 10 and lead 11 the current flowing in element 20 is such as to give an indication representative of the digit 0. With none of the resistors 4 connected between the leads 10 and 11 current flow in element 20 is arranged to generate an indication representative of the number 9. Intermediate numbers of resistors 4, when connected between the leads 10 and 11, generate indications representative of numbers 1–8 inclusive, the specific number being determined by the position of the movable contact 9.

Similarly, a series circuit is established which includes resistors 12 of the digitizer 3 and galvanometer 21, when contact 34 of commutator 27 engages one of the segments 32 of ring 29. By appropriately positioning the movable switch contact 14, current is caused to flow through the element 20 of the galvanometer 21, indicative of any digit from 0 to 9. The resistor 16 is included in a series circuit through the commutator and the element 20 of the galvanometer 21, and is intended to provide a zero indication at the termination of each multiple number indication, this indication being employed to separate multiple digit indications, and to provide a base line or zero indication.

In operation, the contact 34 is initially positioned on one of the conductive segments 31 of the ring 28, thereby including the resistor 16 in series circuit with the coil 20 of the galvanometer 21 to provide a zero or base line indication. Upon rotation of the arm 35 counterclockwise, by any suitable means (not illustrated), the contact 34 sequentially and successively engages the segments 33, 32, and 31 thereby sequentially connecting the resistor series 2, 3 and resistor 16, in series with element 20 of galvanometer 21.

The indication provided by the apparatus of the present invention is illustrated in Figure 2, of the accompanying drawings.

The first number illustrated in Figure 2 is the number 41, which corresponds to the numbers set up in the convertor 1, as illustrated in Figure 1. It will be noted that the first indication is of the tens digit, and has an amplitude equal to a transverse four units on the record. This is immediately followed by an indication having an amplitude of one unit, which corresponds with the number 1, set up in the unit digitizer 3. The unit digit is immediately followed by a zero or base line indication provided by the resistor 16. The form of display of other numbers are also illustrated in Figure 2, the number 14 immediately following the number 41 and the numbers 8 and 80 respectively following the number 14. It will be clear that when a multiple digit number is recorded, having only a units digit, so that the tens digit is equal to zero, the spacing between successive multiple digit indications indicates that fact. More specifically, it will be noted in Figure 2, that there is a double space between the numbers 14 and 8. This indicates that in this display the tens digit is equal to zero and not the units digit. When a number in which the units digit is zero is recorded, such as 80, a double space occurs between the tens digit of successive numbers.

The recorder of the present invention may be employed to record three or four digit numbers, if desired, in which case an additional set of resistors must be added for each additional positional value or digit of the number, and the number of commutating rings of the commutator 27 must be increased by the same number. Although the converter 1 is illustrated and described as operable in the decimal system on numeration, other number systems, such as binary, quaternary, or hexadecimal may be utilized, by providing a suitable number of resistors in the digitizers 2 and 3, remembering that the number of resistors required is always one less than the base number of the system employed.

Although the embodiment of my invention hereinabove described employs only a single converter 1, systems in accordance with my invention may utilize a plurality of converters. Referring again to Figure 1 of the accompanying drawings, there is provided a second converter 37 which is identical with the converter 1. The converter 37 includes a tens digitizer 38 having a variable tap 39, a units digitizer 40 having a variable tap 41, and a fixed resistor 42. The variable taps 39 and 41 and one terminal of fixed resistor 42, are connected respectively to the leads 10, 15, and 17 and the common terminal of digitizers 38 and 40, and the remaining terminal of resistor 42 are connected to a lead 43. The lead 43 is connected in a series circuit comprising limiting resistor 44, a source of fixed D.C. potential 45, a current responsive actuating element 46 of a galvanometer 47 and the return lead 22. Thus, each of the converters 1 and 37 is provided with a separate recording circuit, but all employ the same commutator 27 for sequentially and successively interrogating the various digitizers of each of the converters. The possibility of utilizing a single commutator for a plurality of converters greatly simplifies the circuitry of the system, and in fact any desired number of converters may be connected to the commutator 27 for sequencing thereby. Although each converter is shown as having its own D.C. source, it is readily apparent that a single D.C. source may be connected in the lead 22, thereby further reducing the complexity of the system. The galvanometers 21 and 47 may be initially positioned so that they produce records in parallel separated channels on the medium 25.

While I have described and illustrated one specific example of the present invention it will be clear that variations of the specific details of construction may be resorted to without departing from the true spirit of the invention as defined in the appended claims.

What I claim is:

1. A recording system for providing digital indications of multiple digit numbers, said recording system including a plurality of recording channels, each of said channels comprising digitizer means for generating a plurality of distinct quantized electrical quantities, each of said electrical quantities having a value representative of a different digit of a multiple digit number to be recorded, an indicating means associated with each of said digitizer means and commutator means for sequentially and successively applying electrical quantities generated by a digitizer means to its associated indicating means and for simultaneously applying the electrical quantities representing digits having the same positional value in each of said multiple digit numbers to be recorded each to the indicating means associated with the digitizer means developing said electrical quantity, each of said indicating means including means for producing a variable amplitude waveform, the amplitude of which is proportional at any instant to the value of the electrical quantity applied to said indicating means, said commutator means comprising a plurality of first switch contacts and a second switch contact, said indicating means each having a first and second terminal, means connecting said second switch contact to each of said second terminals, means connecting said first terminal of each of said indicating means through a different digitizer means to each of said first switch contacts, the digitizer means connected to each indicating means establishing the electrical quantities representative of the digits of a multiple digit number, the digitizer means connected to the same first switch contact establishing electrical quantities representing digits having the same potential value in each multiple digit number, and means for sequentially and successively connecting said second switch contact to said first switch contacts.

2. The combination in accordance with claim 1 having a plurality of means for establishing an electrical quantity representative of the digit zero, means connecting each of said last mentioned electrical quantities between said first terminal of each of said indicating means and another of said first switch contacts of said switch means, said another of said first switch contacts being connected to said second switch contact of said switch means at the end of each number indication.

3. The combination in accordance with claim 1 wherein each of said digitizer means comprises an impedance means, a lead having one end connected to said first switch contact of said switch means with which said digitizer means is associated, means for connecting the other end of said lead to various predetermined points along said impedance and means for establishing the point of connection between said lead and said impedance in accordance with the value of the digit to be represented by said digitizer means.

4. The combination in accordance with claim 3 wherein said impedance means comprises a plurality of equal value resistors connected in series, one end of said series connection of resistors being connected to said first terminal of one of said indicating means.

5. The combination in accordance with claim 1 wherein each of said indicating means comprises a string galvanometer.

References Cited in the file of this patent

UNITED STATES PATENTS

| | | |
|---|---|---|
| 963,908 | Lee | July 12, 1910 |
| 1,800,019 | Hewett | Apr. 7, 1931 |
| 2,501,790 | Silverman | Mar. 28, 1950 |
| 2,582,793 | Perry | Jan. 15, 1952 |
| 2,604,955 | Hawkins | July 29, 1952 |
| 2,625,822 | Nichols | Jan. 20, 1953 |
| 2,631,778 | Piper et al. | Mar. 17, 1953 |
| 2,656,523 | Hodson et al. | Oct. 20, 1953 |
| 2,860,832 | Burns | Nov. 18, 1958 |